United States Patent
Lee et al.

(10) Patent No.: US 8,482,667 B1
(45) Date of Patent: Jul. 9, 2013

(54) APPARATUS FOR TRANSMITTING ADDITIONAL INFORMATION USING DIGITAL BROADCAST SYSTEM

(75) Inventors: Jae Kwon Lee, Seoul (KR); Young Woo Suh, Seoul (KR); Il Soo Kyung, Seoul (KR); Sung Ik Park, Daejeon (KR); Heung Mook Kim, Daejeon (KR); Nam Ho Hur, Daejeon (KR)

(73) Assignees: Electronics and Telecommunications Research Institute, Daejeon (KR); Korean Broadcasting System, Seoul (KR)

( * ) Notice: Subject to any disclaimer, the term of this patent is extended or adjusted under 35 U.S.C. 154(b) by 0 days.

(21) Appl. No.: 13/483,656

(22) Filed: May 30, 2012

(51) Int. Cl.
*H04N 7/00* (2011.01)
*H04N 5/21* (2006.01)
*H04N 5/38* (2006.01)
*H04N 5/40* (2006.01)

(52) U.S. Cl.
USPC ............ 348/461; 348/608; 348/723; 348/724

(58) Field of Classification Search
USPC ................. 348/461, 466, 465, 473, 723–726, 348/606–608, 613; 375/296, 297
IPC ................... H04N 7/00,11/00, 5/21, 5/38, 5/40, H04N 5/44, 5/455
See application file for complete search history.

(56) References Cited

U.S. PATENT DOCUMENTS

| | | | |
|---|---|---|---|
| 6,515,712 B1* | 2/2003 | Jeong | 348/723 |
| 7,415,250 B2* | 8/2008 | Sasaki et al. | 375/296 |
| 2005/0143025 A1* | 6/2005 | Suzuki | 375/297 |
| 2010/0295612 A1* | 11/2010 | Ohkawara et al. | 330/149 |

* cited by examiner

*Primary Examiner* — Sherrie Hsia
(74) *Attorney, Agent, or Firm* — Ladas & Parry LLP

(57) ABSTRACT

An apparatus for embedding additional information that may embed additional information into a digital television (TV) broadcast signal and transmit the additional information is provided. The apparatus may modulate the additional information to an intermediate frequency/radio frequency (IF/RF), embed the modulated additional information into the digital TV broadcast signal, and compensate for a distortion that may occur in an RF part, thereby correctly transmitting the additional information.

18 Claims, 13 Drawing Sheets

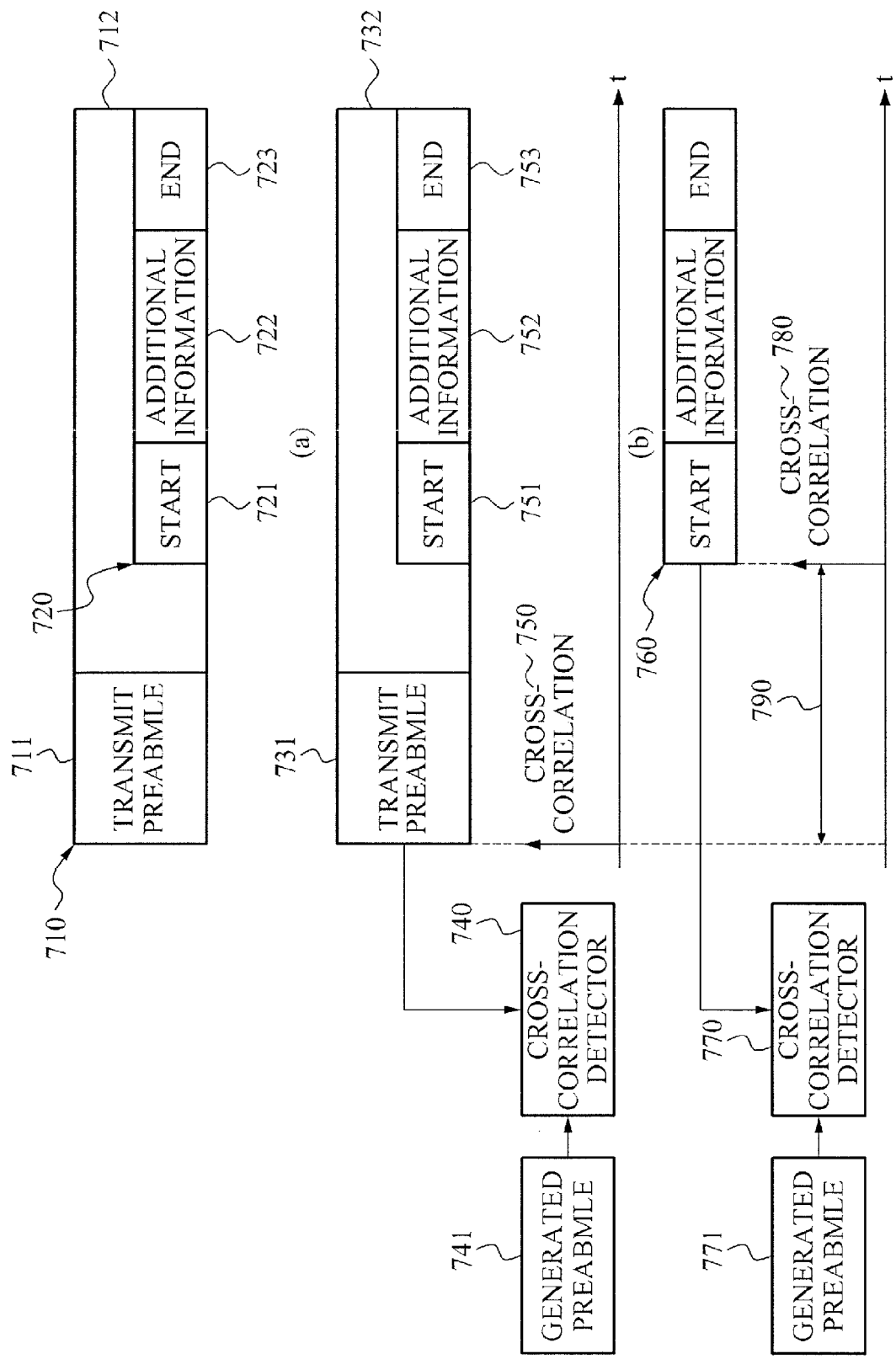

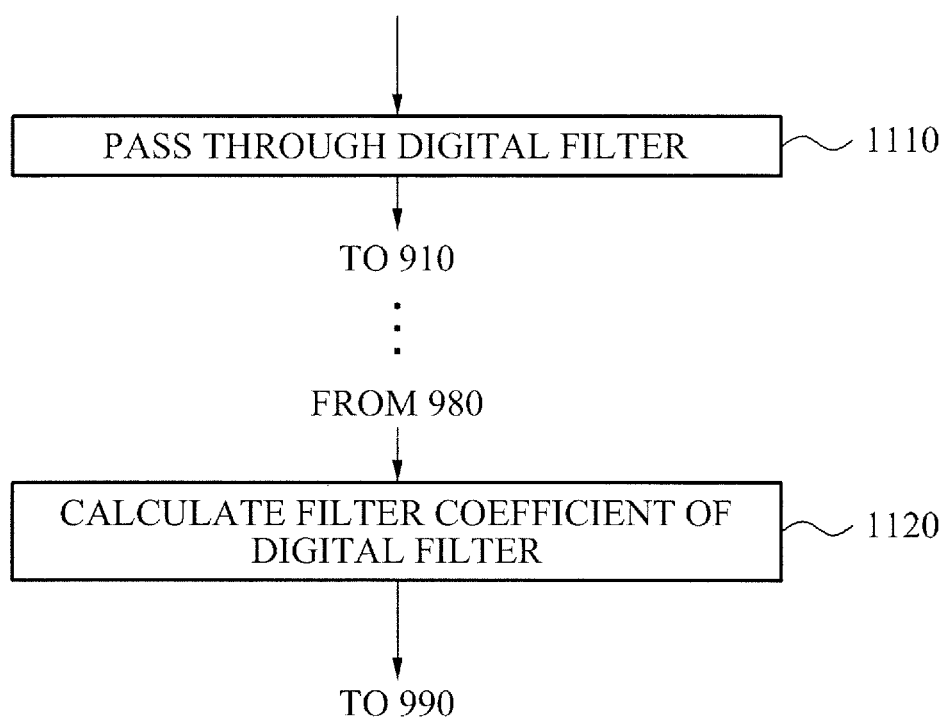

APPARATUS FOR TRANSMITTING ADDITIONAL INFORMATION USING DIGITAL BROADCAST SYSTEM

CROSS-REFERENCE TO RELATED APPLICATION

This application claims the priority benefit of Korean Patent Application No. 10-2012-0025445, filed on Mar. 13, 2012, in the Korean Intellectual Property Office, the disclosure of which is incorporated herein by reference.

BACKGROUND

1. Field of the Invention

The present invention relates to a technique for transmitting additional information using a digital broadcast system, and more particularly, to a technique for facilitating the embedding and transmission of additional information by eliminating a distortion that may occur in embedding the additional information into a digital broadcast signal.

2. Description of the Related Art

A digital watermark technology is a process of transmitting additional information using the same frequency band as that of a broadcast signal. A digital watermark technology aims to provide various additional data services.

Conventionally, a digital watermark technology is applied to a digital television (TV) broadcast signal during modulating the digital TV broadcast signal. However, modulation of a digital TV broadcast signal is processed in a digital broadcast exciter. Accordingly, to additionally embed a digital watermark signal into a digital TV broadcast signal, the digital broadcast exciter needs to be replaced.

The present invention provides an apparatus for embedding a digital watermark signal in the IF/RF type into an intermediate frequency/radio frequency (IF/RF) output signal of a digital broadcast exciter to eliminate the need to replace the existing digital broadcast exciter.

SUMMARY

An aspect of the present invention provides a technique for transmitting additional information using a frequency band of a digital broadcast signal.

Another aspect of the present invention also provides a technique for compensating for a distortion that may occur in a radio frequency (RF) part when embedding additional information into a digital broadcast signal.

According to an aspect of the present invention, there is provided an apparatus for embedding additional information including a modulating unit to modulate additional information related to digital television (TV) broadcast, a frequency upconverting unit to upconvert the modulated additional information to a high frequency band, a signal embedding unit to embed the frequency-upconverted additional information into a digital TV broadcast signal related to the digital TV broadcast, a frequency downconverting unit to downconvert the digital TV broadcast signal including the embedded additional information that has been amplified in a radio frequency (RF) part, a demodulating unit to demodulate the frequency-downconverted digital TV broadcast signal, and a distortion compensating unit to compensate for a distortion in the RF part based on the demodulated digital TV broadcast signal.

Here, the RF part may include a high power amplifier (HPA) or a channel filter.

The apparatus may further include a frequency estimating unit, the digital TV broadcast signal may include a pilot signal, the demodulating unit may demodulate the pilot signal included in the digital TV broadcast signal, the frequency estimating unit may estimate a frequency offset between the frequency-upconverted additional information and the frequency-upconverted digital TV broadcast signal using the demodulated pilot signal, and the modulating unit may modulate the additional information by reflecting the estimated frequency offset on the additional information.

The apparatus may further include a frequency estimating unit, the digital TV broadcast signal may include guard interval data and non-guard interval data, the frequency estimating unit may estimate a frequency offset between the frequency-upconverted additional information and the frequency-upconverted digital TV broadcast signal by comparing the guard interval data with the non-guard interval data, and the modulating unit may modulate the additional information by reflecting the estimated frequency offset on the additional information.

The apparatus may further include a symbol determining unit to determine a symbol of the demodulated digital TV broadcast signal, a second modulating unit to re-modulate the symbol determined digital TV broadcast signal, and a digital TV broadcast signal eliminating unit to eliminate the re-modulated digital TV broadcast signal from the frequency-downconverted digital TV broadcast signal to generate demodulated additional information.

The apparatus may further include a time delay estimating unit to estimate the time delay of the additional information by cross-correlating the demodulated additional information to the additional information.

The time delay estimating unit may generate a preamble, and estimate the time delay of the digital TV broadcast signal by cross-correlating the generated preamble to the symbol determined digital TV broadcast signal.

The apparatus may further include a start time delay compensating unit to control an additional information embedding time in consideration of the time delay of the digital TV broadcast signal and the time delay of the additional information.

According to another aspect of the present invention, there is provided a method for embedding additional information including modulating additional information related to digital TV broadcast, upconverting the modulated additional information to a high frequency band, embedding the frequency-upconverted additional information into a digital TV broadcast signal related to the digital TV broadcast, downconverting the digital TV broadcast signal including the embedded additional information that has been amplified in an RF part, demodulating the frequency-downconverted digital TV broadcast signal, and compensating for a distortion in the RF part based on the demodulated digital TV broadcast signal.

The digital TV broadcast signal may include a pilot signal, the demodulating of the digital TV broadcast signal may include demodulating the pilot signal included in the digital TV broadcast signal, the method may further include estimating a frequency offset between the frequency-upconverted additional information and the frequency-upconverted digital TV broadcast signal, and the modulating of the additional information may include modulating the additional information by reflecting the estimated frequency offset on the additional information.

The digital TV broadcast signal may include guard interval data and non-guard interval data, the method may further include estimating a frequency offset between the frequency-upconverted additional information and the frequency-upconverted digital TV broadcast signal by comparing the guard interval data with the non-guard interval data, and the modulating of the additional information may include modulating the additional information by reflecting the estimated frequency offset on the additional information.

The method may further include determining a symbol of the demodulated digital TV broadcast signal, re-modulating the symbol determined digital TV broadcast signal, and eliminating the re-modulated digital TV broadcast signal from the frequency-downconverted digital TV broadcast signal to generate demodulated additional information.

The method may further include estimating the time delay of the additional information by cross-correlating the demodulated additional information to the additional information.

The method may further include generating a preamble and estimating the time delay of the digital TV broadcast signal by cross-correlating the generated preamble to the symbol determined digital TV broadcast signal.

The method may further include controlling an additional information embedding time in consideration of the time delay of the digital TV broadcast signal and the time delay of the additional information.

The method may further include passing the additional information through a digital filter, and calculating a filter coefficient of the digital filter such that a difference between the passed additional information and the demodulated additional information is minimal.

Effect of the Invention

According to embodiments of the present invention, additional information may be transmitted using a frequency band of a digital broadcast signal.

According to embodiments of the present invention, a distortion that may occur in a radio frequency (RF) part when embedding additional information into a digital broadcast signal may be compensated for.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 7 is a diagram illustrating time delay estimation using cross-correlation;

FIG. 11 is a flowchart illustrating a method for compensating a distortion using a digital filter according to an embodiment of the present invention.

DETAILED DESCRIPTION

Figure 1:
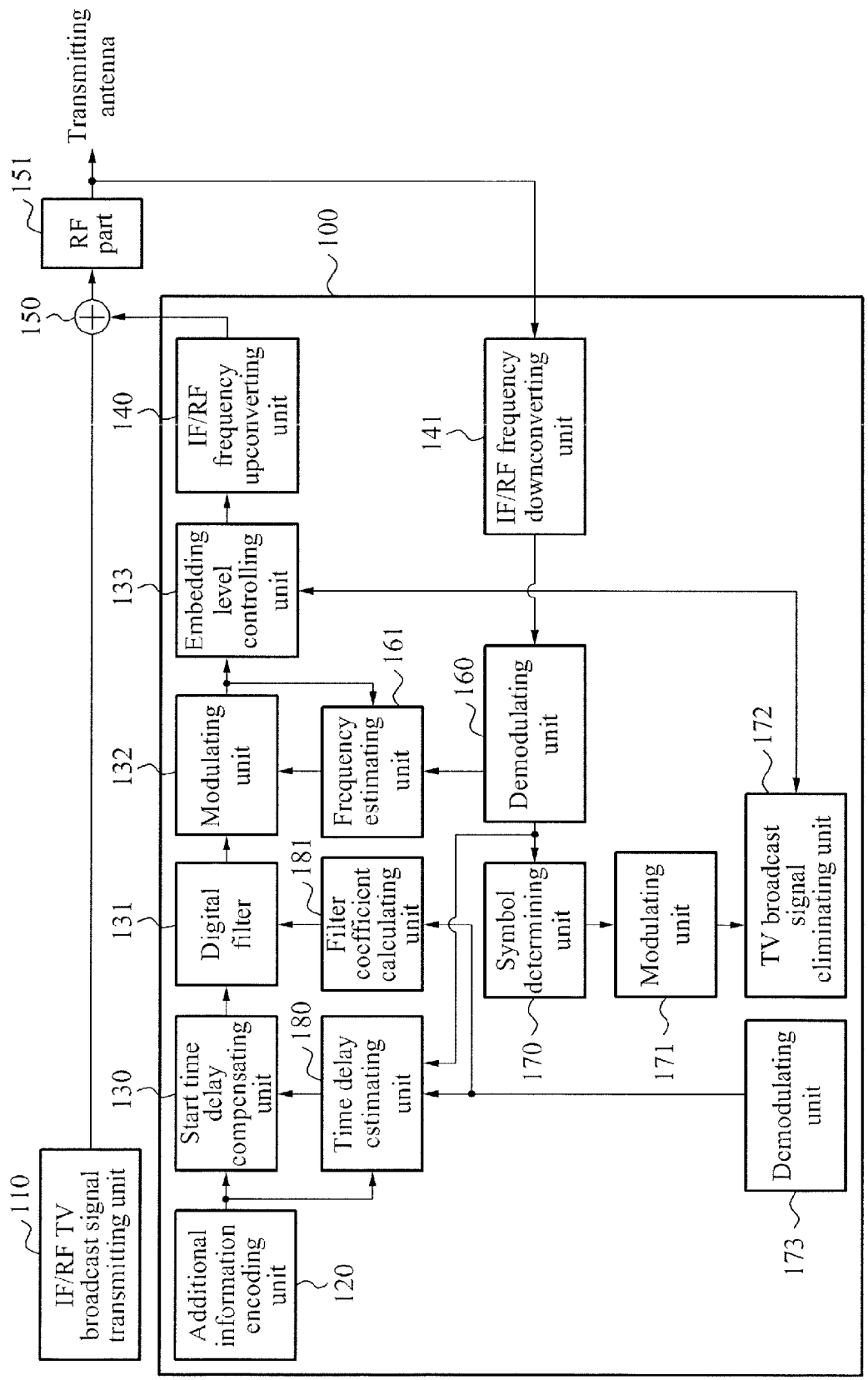
FIG. 1 is a block diagram illustrating a structure of an apparatus for embedding additional information according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a structure of an apparatus 100 for embedding additional information according to an embodiment of the present invention.

An intermediate frequency/radio frequency (IF/RF) digital television (TV) broadcast signal transmitting unit 110 may modulate a digital TV broadcast signal to an IF/RF frequency band.

The apparatus 100 for embedding additional information may embed additional information into the IF/RF frequency digital TV broadcast signal. The apparatus 100 for embedding additional information may include an additional information encoding unit 120, a start time delay compensating unit 130, a digital filter 131, a modulating unit 132, an embedding level controlling unit 133, a time delay estimating unit 180, a filter coefficient calculating unit 181, a frequency estimating unit 161, a symbol determining unit 170, a demodulating unit 160, a modulating unit 171, a digital TV broadcast signal eliminating unit 172, and a demodulating unit 173.

The additional information encoding unit 120 may encode inputted additional information. In this instance, an encoding technique may be used in a manner such that inputted additional information is multiplied by a specific spread signal to spread the additional information in the frequency domain. The detailed description of the additional information encoding is made below with reference to FIG. 4.

The time delay estimating unit 180 may estimate the time delay in an RF part 151, through which the additional information embedded into the digital TV broadcast signal passes. The start time delay compensating unit 130 may delay the additional information based on the estimated time delay to synchronize the digital TV broadcast signal with the additional information in time. Here, the RF part 151 may include a high power amplifier (HPA) to amplify the digital TV broadcast signal, or a channel filter. The detailed description of the additional information delay based on the time delay is made below with reference to FIG. 5.

The digital filter 131 may compensate for a distortion in the RF part 151 that may occur when the additional information embedded into the digital TV broadcast signal passes through the RF part 151. In an aspect, the filter coefficient calculating unit 181 may calculate a filter coefficient of the digital filter 131. In this instance, the filter coefficient calculating unit 181 may calculate a filter coefficient of the digital filter 131 such that a residual error between an output signal of the digital filter 131 and a reference signal is minimum.

Here, the output signal of the digital filter 131 may be represented by Equation 1:

$$b(t) = H \cdot A \quad \text{[Equation 1]}$$

where H denotes a coefficient of the digital filter 131 having a length L, and A denotes an input of the digital filter 131. The digital filter 131 may have L tabs for example, [a(t), a(t−1), a(t−2), . . . , a(t−L+1)].

The modulating unit 132 may modulate the additional information into a signal suitable for a frequency band of the digital TV broadcast signal. The frequency estimating unit 161 may estimate a frequency offset to be applied to the modulating unit 132, and the modulating unit 132 may modulate the additional information using the estimated frequency offset. A detailed description of the frequency offset estimation of the frequency estimating unit 161 is provided as follows with reference to FIGS. 6A through 6C.

Here, an output signal of the modulating unit 132 may be represented by Equation 2:

$$c(t) = \alpha \cdot b(t) \cdot e^{j2\pi(f_c + f_\Delta)t} \quad \text{[Equation 2]}$$

where $\alpha$ denotes an embedding level, $f_c$ denotes a IF/RF center frequency, and $f_\Delta$ denotes a frequency offset.

The embedding level controlling unit 133 may determine an embedding level of embedding the modulated additional information into the digital TV broadcast signal. The additional information may be embedded into the digital TV broadcast signal at a lower power than that of the digital TV broadcast signal not to hinder the transmission of the digital TV broadcast signal. The embedding level controlling unit 133 may control the transmission power of the additional information in consideration of the transmission power of the digital TV broadcast signal.

Here, a value of the embedding level $\alpha$ may be represented by Equation 3:

$$\alpha = \sqrt{\frac{Pow_{feedback}}{Pow_{modulator} \cdot 10^{\frac{BR\ [dB]}{10}}}} \quad \text{[Equation 3]}$$

where $Pow_{feedback}$ denotes an average power of an IF/RF frequency downconverted feedback signal, $Pow_{modulator}$ denotes an average power of modulated additional information, and BR denotes an embedding level of additional information that is indicated in units of decibels (dB). In this instance, the embedding level may be determined 30 dB or less.

An IF/RF frequency upconverting unit 140 may upconvert the modulated and embedding level determined additional information to a high frequency band. An additional information embedding unit 150 may embed the frequency-upconverted additional information into the digital TV broadcast signal.

The digital TV broadcast signal may pass through the RF part 151. The RF part 151 may include an HPA or a channel filter. The HPA may amplify the digital TV broadcast signal to transmit the digital TV broadcast signal over a long distance. The channel filter may filter the digital TV broadcast signal in consideration of the frequency band of the digital TV broadcast signal. In this instance, the additional information may experience an RF analog distortion while passing through the RF part 151.

An IF/RF frequency downconverting unit 141 may downconvert the digital TV broadcast signal including the embedded additional information. A portion of the frequency-downconverted digital TV broadcast signal may be inputted into the embedding level controlling unit 133.

The demodulating unit 160 may demodulate the frequency-downconverted digital TV broadcast signal. The demodulated digital TV broadcast signal may be represented by Equation 4:

$$d(t) = s(t) + \alpha \cdot D_{RF} \cdot b(t) \quad \text{[Equation 4]}$$

where d(t) denotes a frequency-downconverted digital TV broadcast signal with additional information, s(t) denotes a frequency-downconverted digital TV broadcast signal without additional information, b(t) denotes frequency-downconverted additional information, $\alpha$ denotes an embedding level, and $D_{RF}$ denotes a distortion occurring in the RF part 351.

The symbol determining unit 170 may determine a symbol of the frequency-downconverted digital TV broadcast signal. Referring to Equation 4, it can be considered that the frequency-downconverted digital TV broadcast signal has the additional information embedded in a form of noise. Since the transmission power of the additional information is lower than that of the digital TV broadcast signal, the symbol determined digital TV broadcast signal may include only the digital TV broadcast signal.

As an example, the symbol determining unit 170 may estimate a symbol of the digital TV broadcast signal by a hard decision or a soft decision. When the hard decision is used, the symbol determining unit 170 may quickly estimate a received symbol by estimating transmission data with maximum likelihood estimation. However, the lower a signal-noise ratio (SNR), the greater the possibility that an error will occur between the estimated received symbol and the transmit symbol. When the soft decision is used, the symbol determining unit 170 may correct an error using forward error correction (FEC) decoding applied to the symbol of the digital TV broadcast signal and may estimate a received symbol. In this case, an FEC processing time is required. However the lower an SNR, in the lower the possibility that an error will occur between the estimated received symbol and the transmit symbol. Accordingly, a more correct transmit symbol estimation may be realized.

An output of the symbol determining unit 170 may be represented by Equation 5:

$$d'(t) \approx s(t) \quad \text{[Equation 5]}$$

where d'(t) denotes an output of the symbol determining unit 170, and s(t) denotes a frequency-downconverted digital TV broadcast signal without additional information.

The modulating unit 171 may re-modulate the symbol determined digital TV broadcast signal.

The digital TV broadcast signal eliminating unit 172 may eliminate the re-modulated digital TV broadcast signal from the frequency-downconverted digital TV broadcast signal. The frequency-downconverted digital TV broadcast signal outputted from the IF/RF frequency downconverting unit 141 includes the additional information as well as the digital TV broadcast signal. In contrast, the re-modulated digital TV broadcast signal outputted from the modulating unit 171 includes only the digital TV broadcast signal.

Accordingly, the digital TV broadcast signal eliminating unit 172 may eliminate the re-modulated digital TV broadcast signal from the frequency-downconverted digital TV broadcast signal to generate additional information including only the distortion in the RF part 151.

Here, the additional information including only the distortion in the RF part 151 may be represented by Equation 6:

$$b'(t) = \alpha \cdot D_{RF} \cdot b(t) \quad \text{[Equation 6]}$$

where b'(t) denotes additional information including only the distortion in the RF part 151.

The demodulating unit 173 may re-demodulate the additional information including only the distortion in the RF part 151, and may provide it to the time delay estimating unit 180 and the filter coefficient calculating unit 181.

The time delay estimating unit 180 may estimate the time delay in the RF part 151, through which the additional information embedded in the digital TV broadcast signal passes. A detailed description of the operation of the time delay estimating unit 180 is provided as follows with reference to FIG. 7.

The filter coefficient calculating unit 181 may calculate a filter coefficient of the digital filter 131 such that a residual error between the demodulated digital TV broadcast signal (including the digital TV broadcast signal and the additional information) and the additional information is minimal.

The residual error may be represented by Equation 7:

$$\text{err}^- = |b(t) - H \cdot B'| \qquad \text{[Equation 7]}$$

where err denotes a residual error, b(t) denotes additional information, H denotes a coefficient of the digital filter 131 having a length L, and B' denotes an input of the digital filter 131 such as, [b'(t), b'(t−1), b'(t−2), ..., b'(t−L+1)].

The filter coefficient calculating unit 181 may calculate a filter coefficient H using a least mean square (LMS), a recursive least square (RLS), a minimum mean square error (MMSE), and the like. When the LMS is used, the filter coefficient may be updated as represented by Equation 8:

$$H_n = H_{n-1} + u \cdot \text{err} \cdot B'^* \qquad \text{[Equation 8]}$$

where $H_n$ denotes an nth filter coefficient, $H_{n-1}$ denotes an n−1th filter coefficient, u denotes a constant value, and $B'^*$ denotes a Hermitian operation of an input B' of the digital filter 131.

Figure 2:
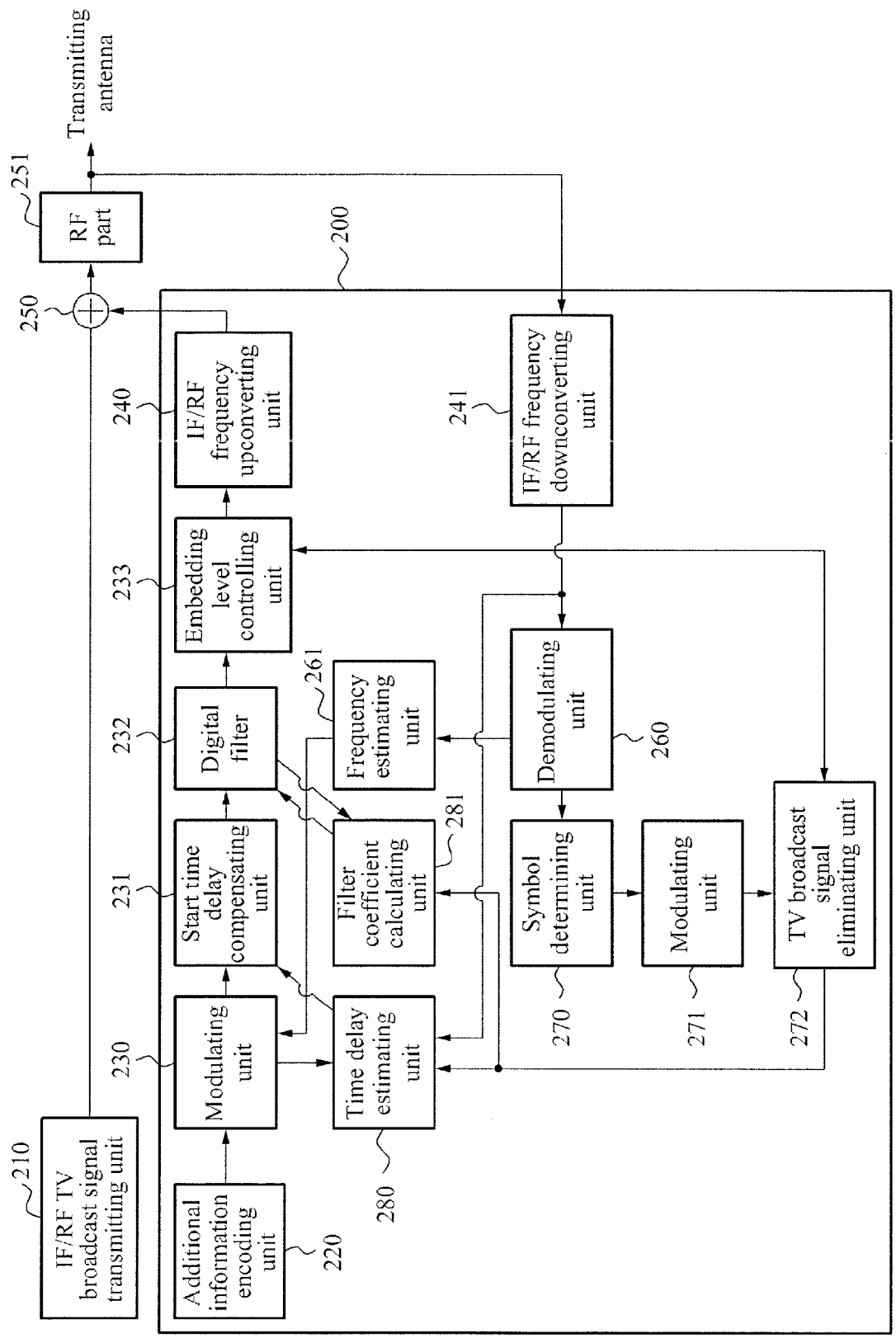
FIG. 2 is a block diagram illustrating a structure of an apparatus for embedding additional information according to another embodiment of the present invention.

FIG. 2 is a block diagram illustrating a structure of an apparatus for embedding additional information according to another embodiment of the present invention. The embodiment of FIG. 2 is similar to that of FIG. 1 and thus, a detailed description is omitted herein.

A digital TV broadcast signal eliminating unit 272 may generate additional information including only a distortion in an RF part 251.

A time delay estimating unit 280 may estimate the time delay using modulated additional information, but not demodulated additional information. For this purpose, the time delay estimating unit 280 may receive a modulated digital TV broadcast signal, including the additional information, from an IF/RF frequency downconverting unit 241.

A start time delay compensating unit 231 may compensate for the start time delay of the additional information modulated by a modulating unit 230.

Figure 3:
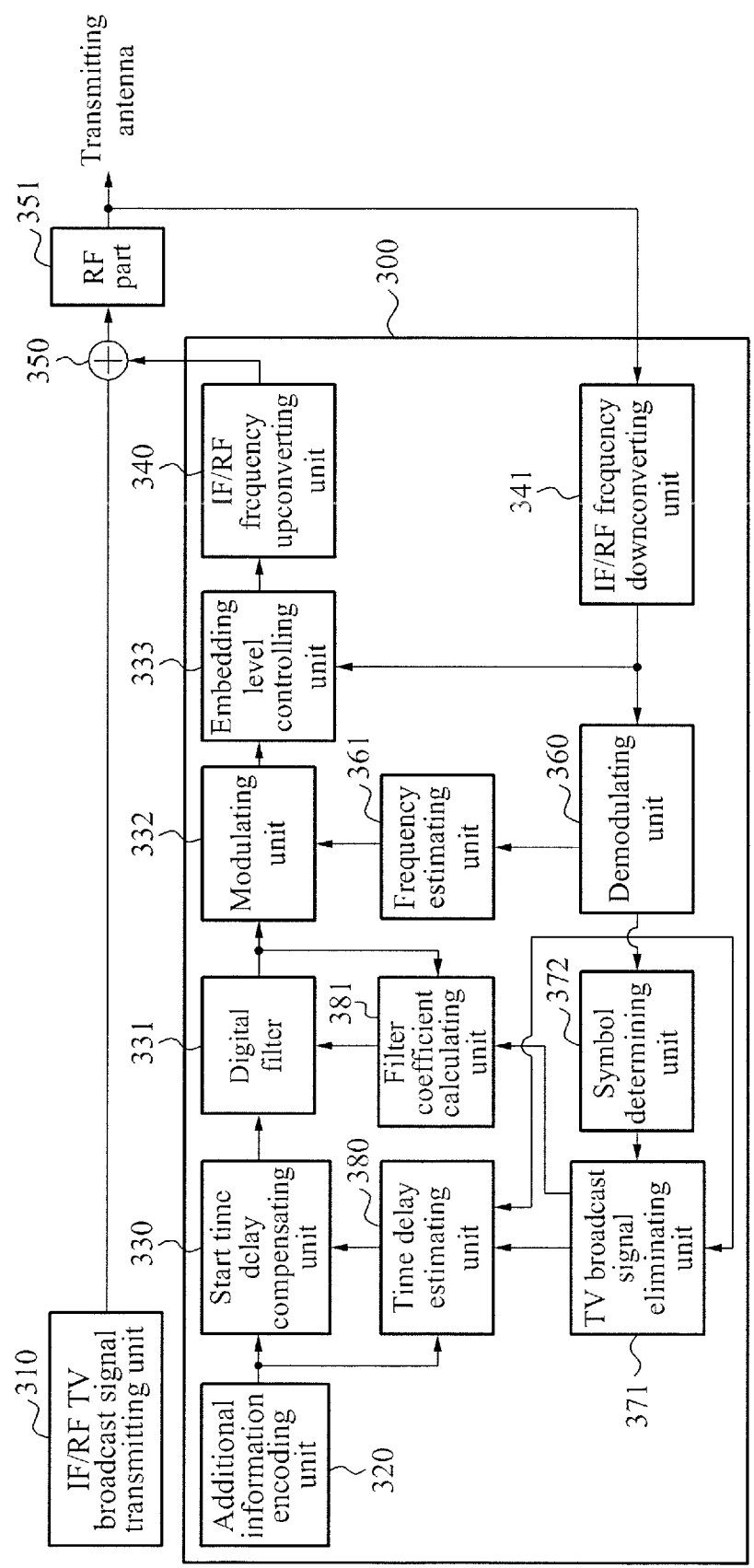
FIG. 3 is a block diagram illustrating a structure of an apparatus for embedding additional information according to still another embodiment of the present invention.

FIG. 3 is a block diagram illustrating a structure of an apparatus for embedding additional information according to still another embodiment of the present invention.

A digital TV broadcast signal eliminating unit 371 may generate additional information including only a distortion in an RF part 351 using a non-modulated symbol.

Since the additional information including only the distortion in the RF part 351 to be applied to a time delay estimating unit 380 and a filter coefficient calculating unit 381 is not modulated, the operation of the time delay estimating unit 380 and the filter coefficient calculating unit 381 is similar to that of FIG. 1 and thus, a repeated description will be omitted for conciseness.

Figure 4:
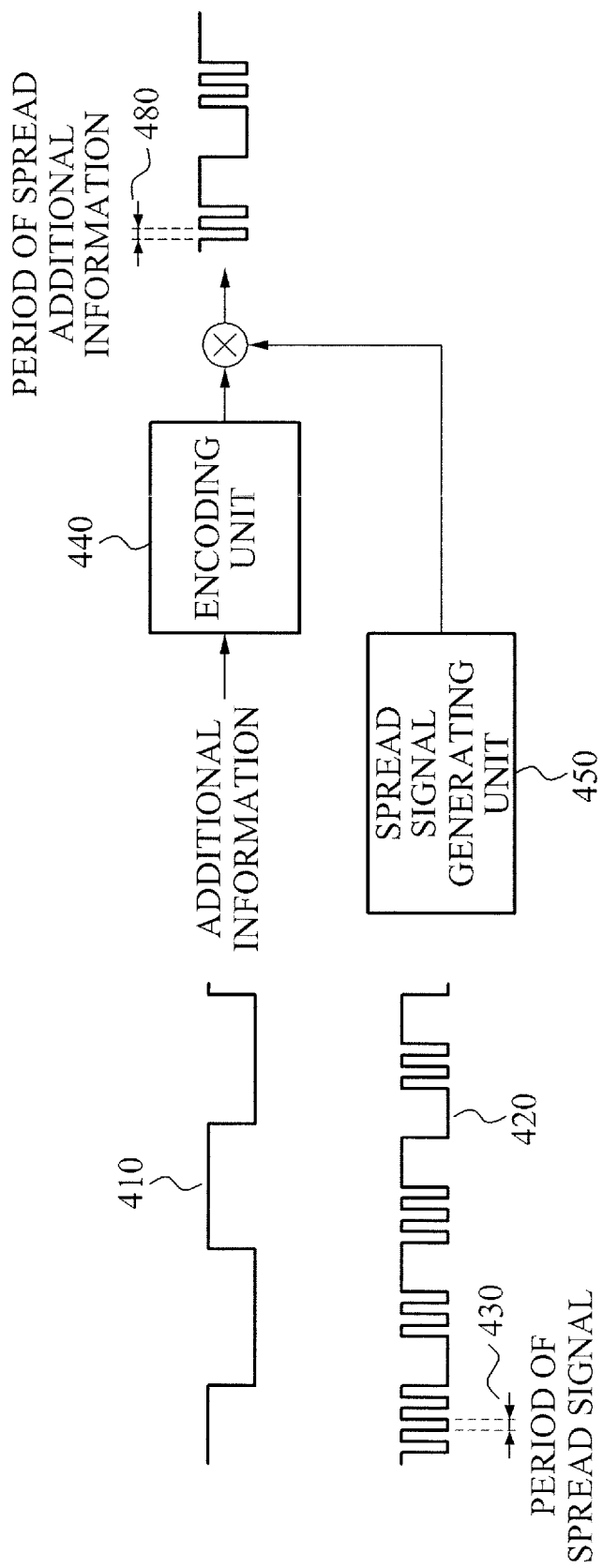
FIG. 4 is a diagram illustrating additional information encoding.

FIG. 4 is a diagram illustrating the additional information encoding.

A spread signal generating unit 450 may generate a spread signal 420 for spreading additional information 410. In this instance, the period of the additional information 410 may be longer than the period 430 of the spread signal 420.

An encoding unit 440 may multiply the additional information 410 by the spread signal 420 to spread the additional information 410 in the frequency domain. The spread additional information 410 may have a reduced power density per frequency.

The spread additional information 410 may have the same period 480 as the period 430 of the spread signal 420.

According to another embodiment, an encoding technique enabling error detection characteristics of the digital TV broadcast signal using FEC to be robust may be used.

As an example, the additional information may be a signal made up of a real number or a complex number.

Figure 5:
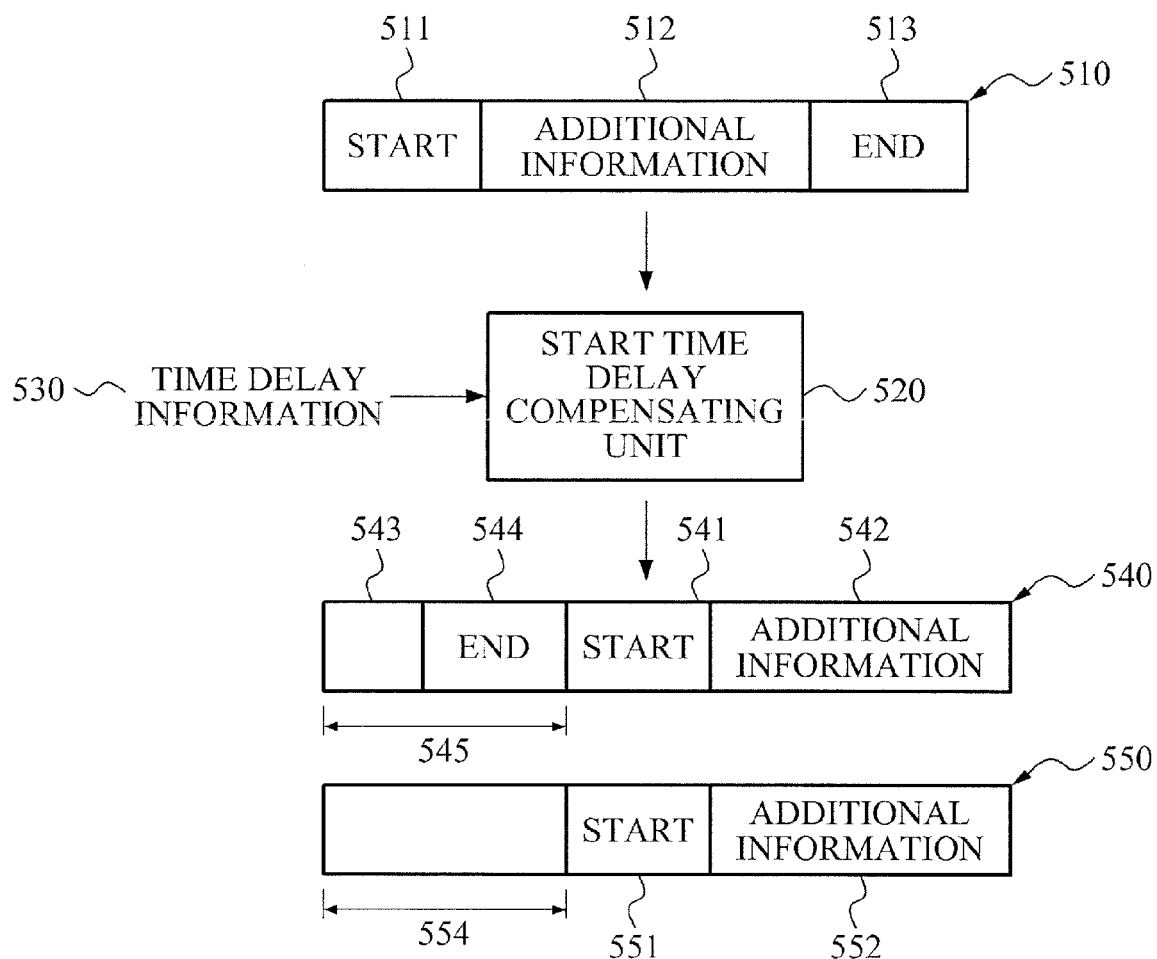
FIG. 5 is a diagram illustrating start time delay compensation based on a time delay.

FIG. 5 is a diagram illustrating the start time delay compensation based on the time delay.

As shown in FIG. 5, the additional information embedded into the digital TV broadcast signal may have a configuration of an additional information frame 510. The additional information frame 510 may include a start 511, additional information 512, and an end 513.

A start time delay compensating unit 520 may receive time delay information 530 from the time delay estimating unit. The start time delay compensating unit 520 may move a location of a start 541 in a frame 540 based on the received time delay information 530. In this case, the start 541 may be delayed by as much as a time delay 545 to the middle of the frame 540. As the start 541 moves, additional information 542 and 543 and an end 544 may move accordingly.

According to a first embodiment, when a value of the time delay 545 is greater than a size of the end 544, a rear portion 543 of the additional information 542 and 543 may move to a front portion of the frame 540.

According to a second embodiment, when a value of the time delay information 530 is greater than a size of the end 544, '0' may be inserted into a front portion of a frame 550 corresponding to the time delay 554. In this case, a start 551 is delayed by as much as a time delay 554 to the middle of the frame 550. As the start 551 moves, additional information 552 may move accordingly.

Figure 6A:
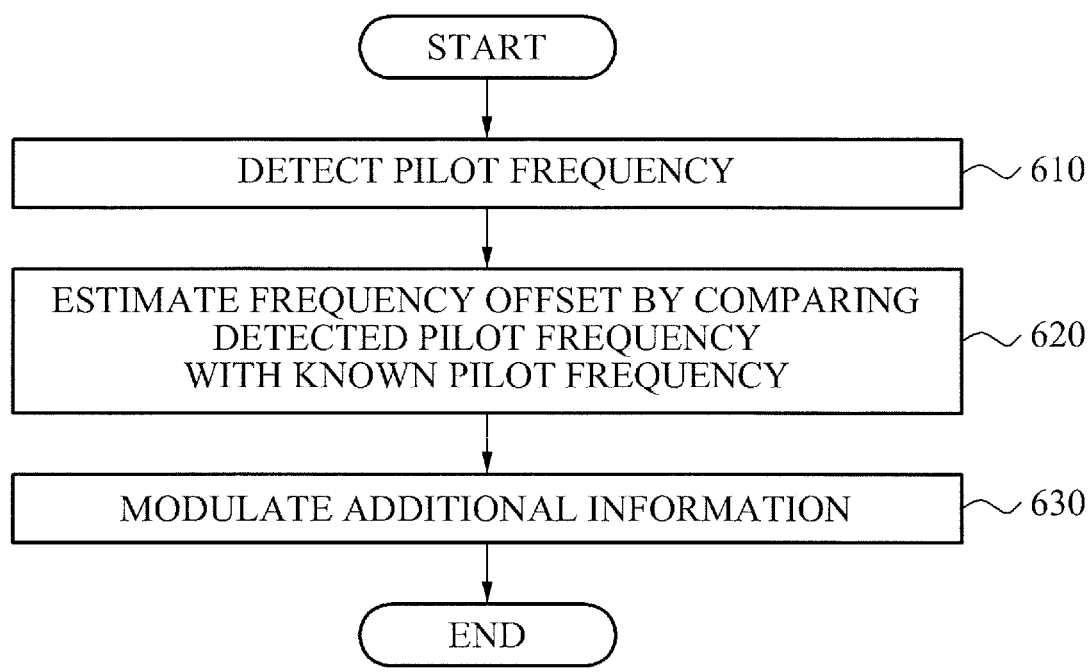
FIGS. 6A through 6C are flowcharts illustrating frequency offset estimation according to embodiments of the present invention.
Figure 6B:
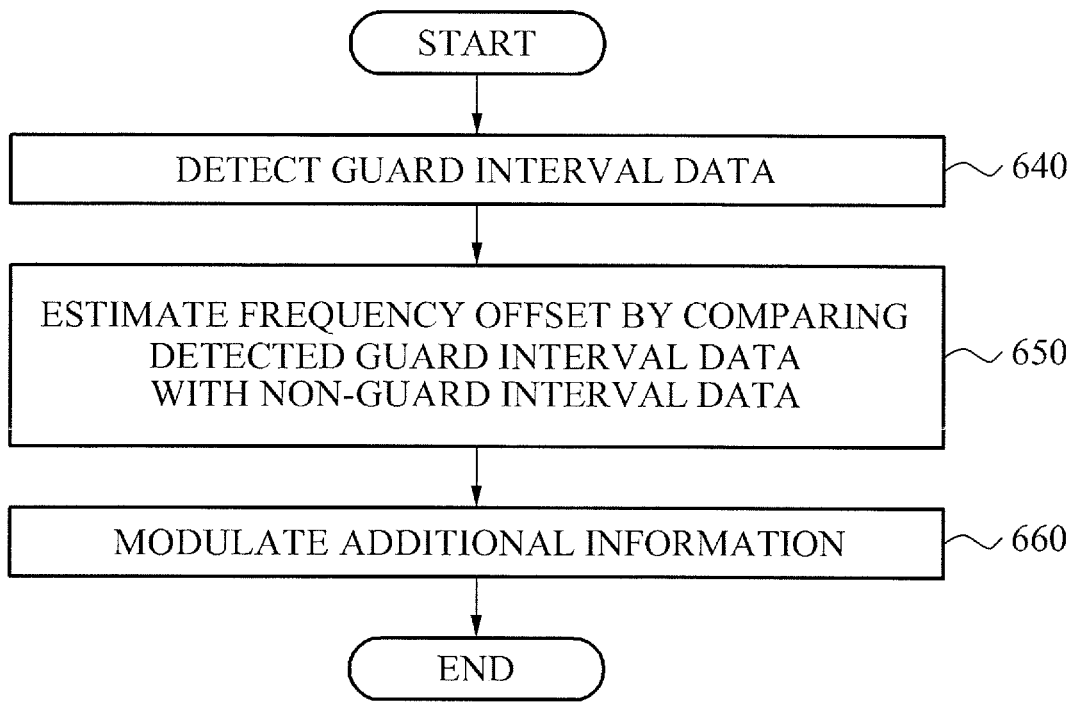
Figure 6C:
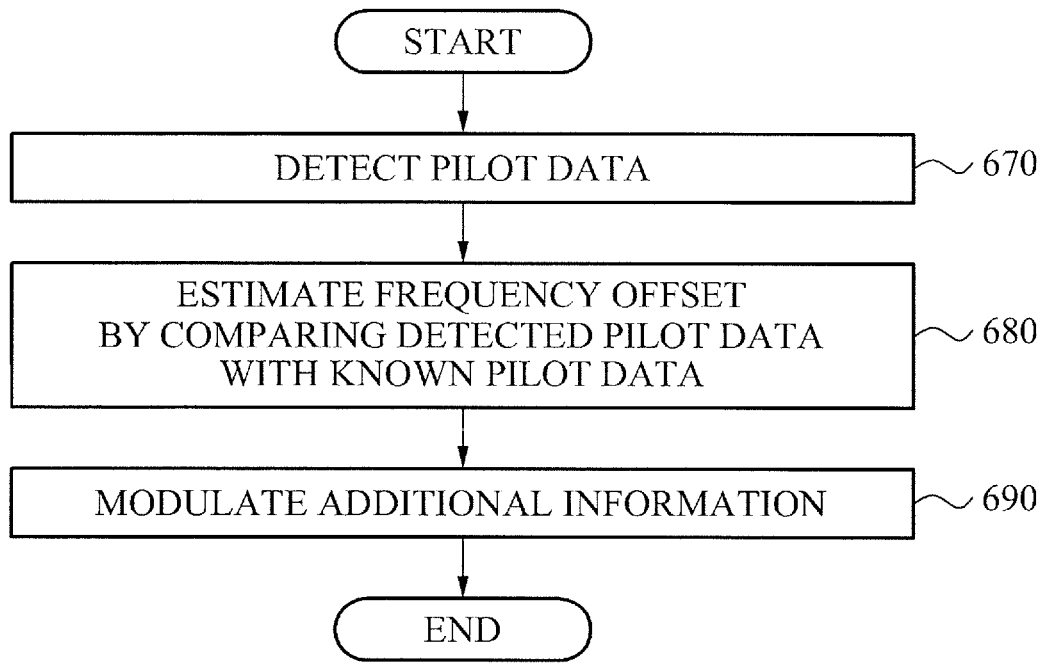

FIGS. 6A through 6C are flowcharts illustrating the frequency offset estimation according to embodiments of the present invention.

FIG. 6A shows the frequency offset estimation when the digital TV broadcast signal is modulated using a vestigial side band (VSB). Here, the digital TV broadcast signal may include a pilot frequency situated at −2.69 megahertz (MHz) from a center frequency of the digital TV broadcast signal.

In operation 610, the frequency estimating unit of the apparatus for embedding additional information may detect the pilot frequency in the digital TV broadcast signal.

In operation 620, the frequency estimating unit may estimate a frequency offset by comparing the detected pilot frequency of the digital TV broadcast signal to a known pilot frequency. Here, the frequency offset is a value obtained by deducing the detected pilot frequency from the known pilot frequency.

In operation 630, the modulating unit of the apparatus for embedding additional information may modulate the additional information by reflecting the estimated frequency offset on the additional information. When a value of the estimated frequency offset is '+', the modulating unit may update the frequency, to which the additional information is modulated, to a higher frequency. When a value of the estimated frequency offset is '−', the modulating unit may update the frequency, to which the additional information is modulated, to a lower frequency.

FIG. 6B illustrates frequency offset estimation when the digital TV broadcast signal is modulated using orthogonal frequency division multiplexing (OFDM). As an example, the digital TV broadcast signal modulated using OFDM may be variably transmitted depending on a guard interval and a non-guard interval.

Here, a cyclic prefix (CP) is transmitted during the guard interval, and the digital TV broadcast signal is transmitted during the non-guard interval. As an example, the CP may be generated by repeating a portion of the digital TV broadcast signal.

Accordingly, in operation 640, the frequency estimating unit may detect the CP transmitted during the guard interval.

In operation 650, the frequency estimating unit may estimate a frequency offset by comparing the detected CP with the digital TV broadcast signal.

In operation 660, the modulating unit may modulate the additional information in a manner similar to operation 630.

FIG. 6C shows the frequency offset estimation when the digital TV broadcast signal includes pilot data.

In operation 670, the frequency estimating unit may detect the pilot data in the digital TV broadcast signal. Generally, since pilot data is data that is already determined, the frequency estimating unit may know a value of the pilot data.

In operation 680, the frequency estimating unit may estimate a frequency offset by comparing the detected pilot data to the known plot data.

In operation 690, the modulating unit may modulate the additional information in a manner similar to operation 630.

FIG. 7 is a diagram illustrating the time delay estimation using cross-correlation.

Here, the digital TV broadcast signal may be transmitted in the unit of a frame 710. The frame 710 may include a transmit preamble 711 at a front portion and a digital TV broadcast signal 712 at the remaining part. The digital TV broadcast signal 712 may have an additional information frame 720. The additional information frame 720 may include a start 721, additional information 722, and an end 723.

In this case, the time delay estimating unit may generate a transmit preamble 741, and may calculate cross-correlation between the generated transmit preamble 741 and a transmit preamble 731 included in a frame 730 using a cross-correlation detector 740. The time delay estimating unit may estimate the time delay of the frame 730 using the calculated cross-correlation. Here, cross-correlation is a parameter indicating a relationship between two signal patterns. When two signal patterns are equal, high cross-correlation is calculated, and when two signal patterns are not equal, low cross-correlation is calculated. Here, cross-correlation between two signal patterns may be calculated by Equation 9:

$$r_{xy} = \frac{\sum_{i=1}^{n}(x_i - \bar{x})(y_i - \bar{y})}{(n-1)s_x s_y} = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}},$$ [Equation 9]

where x, y denote two signal patterns for calculating cross-correlation, and $\bar{x}$, $\bar{y}$ each denote an average value of the signal pattern x, y.

The generated transmit preamble 741 may have high cross-correlation with the transmit preamble 731 included in the frame 730, but may have low cross-correlation with a transmit preamble 731 included in the frame 730, but may have low cross-correlation with a digital TV broadcast signal 732, a start 751, additional information 752, and an end 753 included in the frame 730.

The time delay estimating unit may determine a time when the highest cross-correlation between the generated transmit preamble 741 and the frame 730 is calculated, as a start of the frame 730. When the start of the frame 730 is determined, the time delay estimating unit may estimate the time delay of the frame 730.

Also, the time delay estimating unit may calculate cross-correlation between additional information 760 including only the distortion in the RF part and additional information 771 received from the additional information encoding unit using a cross-correlation detector 770.

Here, the additional information 760 including only the distortion in the RF part corresponds to a time-delayed result of the additional information 771 received from the additional information encoding unit.

The time delay estimating unit may determine a time at which a highest cross-correlation 780 between the two additional information 760 and 771 is calculated to be a start of the additional information 760 including only the distortion in the RF part.

The time delay estimating unit may estimate a difference in time 790 between the start of the additional information 760 including only the distortion in the RF part and the start 731 of the frame 730, as the time delay of the additional information.

The time delay estimating unit of FIGS. 1, 2, and 3 may synchronize the additional information and the digital TV broadcast signal in time by moving the additional information based on the estimated time delay.

Figure 8:
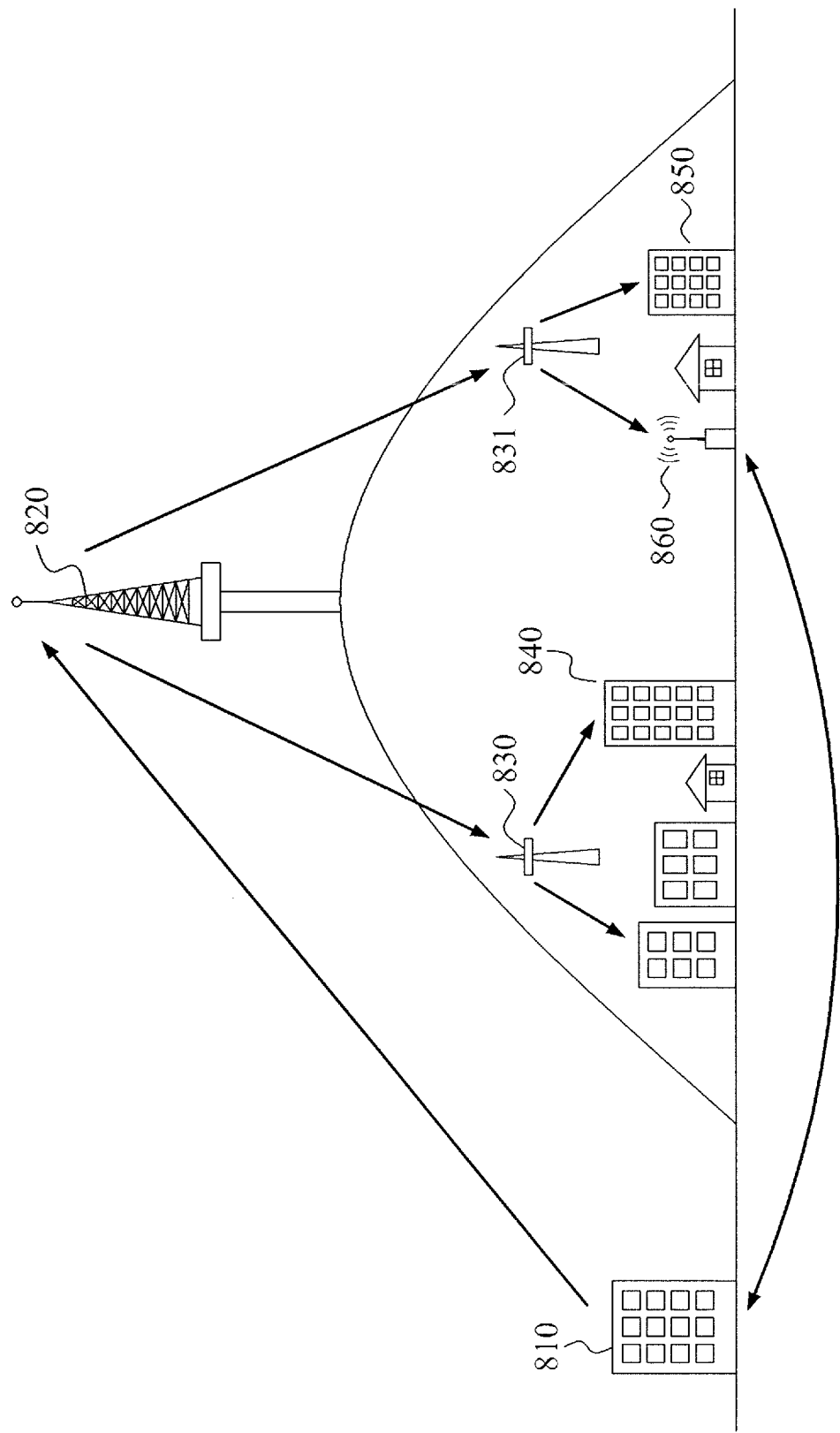
FIG. 8 is a diagram illustrating the concept of controlling a digital television (TV) broadcast system using additional information.

FIG. 8 is a diagram illustrating the concept of controlling a digital TV broadcast system using additional information.

A broadcasting station apparatus 810 may transmit video data and audio data to a transmitter 820 via the Internet. As an example, the broadcasting station apparatus 810 may transmit broadcast network management information to the transmitter 820.

The transmitter 820 may receive the broadcast network management information together with the digital TV broadcast signal. The transmitter 820 may modulate the video signal and the audio signal included in the digital TV broadcast signal by using a suitable modulation method, and may transmit it as a conventional broadcast signal. The transmitter 820 may embed the broadcast network management information into the digital TV broadcast signal as additional information and then transmit the digital TV broadcast signal.

Relays 830 and 831 may receive the broadcast network management information from the transmitter 820, and may automatically manage the state of the relays 830 and 831 based on the received broadcast network management information. The relays 830 and 831 may embed information related to the current state of the relays 830 and 831 into an output signal of the relays 830 and 831 and then transmit the output signal.

A remote receiver 860 may receive the output signal from the relays 830 and 831 and may monitor the state of the relays 830 and 831 remotely. In this instance, the receiver 860 may remotely monitor the state of the relays 830 and 831 by using changes in signal measurements, by linking to a wired/wireless Internet connection or by directly receiving the signal from the relays 830 and 831.

Through the process of FIG. 8, a duplex broadcast network management process may be implemented using a simplex broadcast system.

Although FIG. 8 shows that broadcast network management information is used as an example of additional information, the present invention is not limited in this regard. The additional information may be information that is available in homes 840 and 850 to provide various services to customers.

Figure 9:
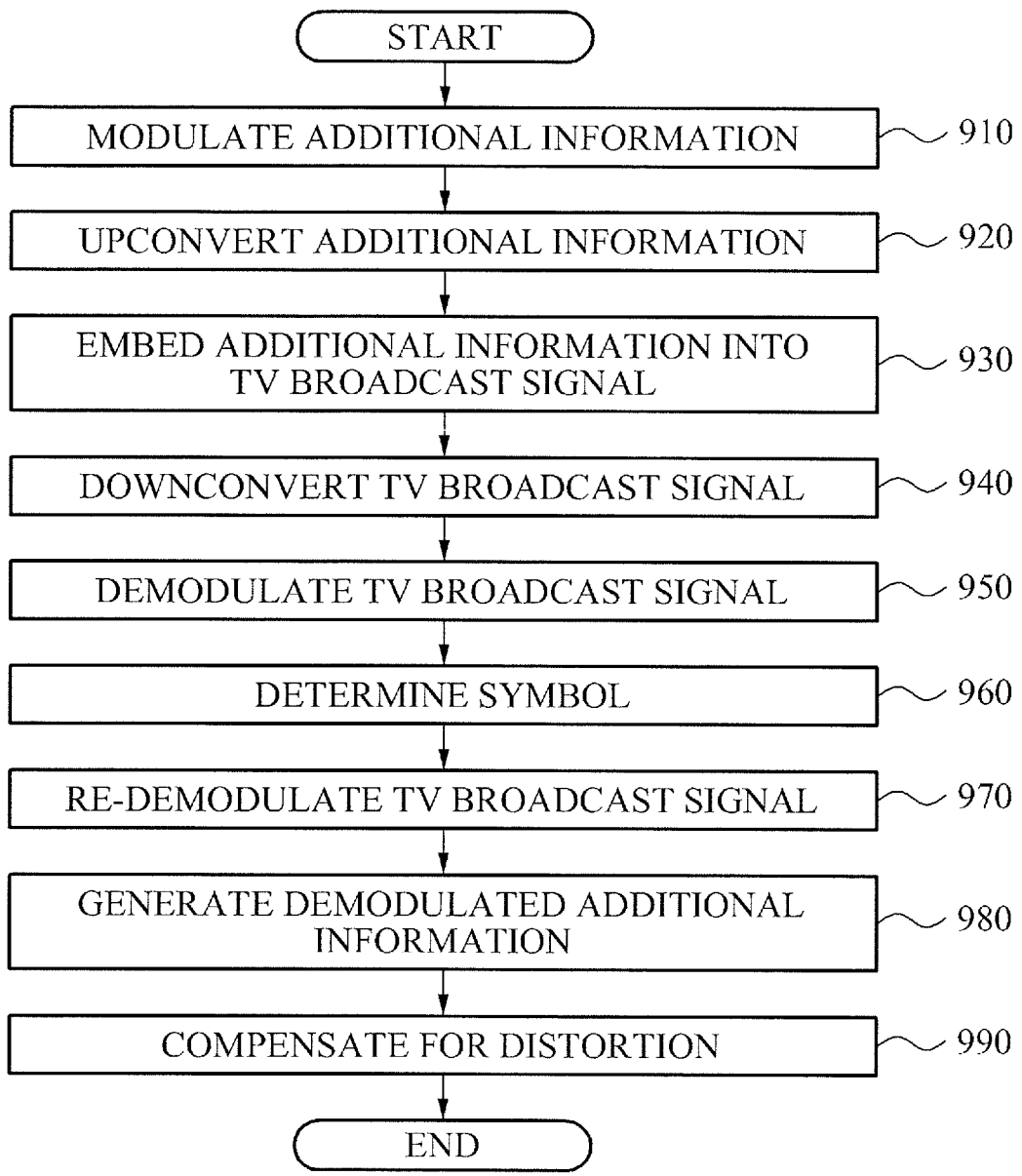
FIG. 9 is a flowchart illustrating a method for embedding additional information to according to an embodiment of the present invention.

FIG. 9 is a flowchart illustrating a method for embedding additional information according to an embodiment of the present invention.

In operation 910, the apparatus for embedding additional information may modulate additional information related to a digital TV broadcast. Here, the additional information may be a signal that is spread in the frequency domain using a spread signal or information that is encoded using FEC.

In operation 910, the apparatus for embedding additional information may multiply the additional information by a spread signal having a shorter period than that of the additional information to reduce the power density of the additional information per frequency.

For example, in operation 910, the apparatus for embedding additional information may apply an encoding technique to make error detection characteristics of the digital TV broadcast signal robust using FEC.

In operation 920, the apparatus for embedding additional information may upconvert the modulated additional information to a high frequency band.

As an example, the modulated additional information may be compensated for at the start time delay and the distortion in the RF part. In this case, the apparatus for embedding additional information may upconvert the time delay and distortion compensated additional information to a high frequency band.

A detailed description of the time delay estimation and compensation is provided in the following with reference to FIG. 10. Also, a detailed description of the distortion compensation is provided in the following with reference to FIG. 11.

In operation 930, the apparatus for embedding additional information may embed the frequency-upconverted additional information into a digital TV broadcast signal related to the digital TV broadcast.

The digital TV broadcast signal including the embedded additional information may pass through the RF part. Here, the RF part may include an HPA or a channel filter. The digital TV broadcast signal including the embedded additional information may experience a non-linear distortion while passing through the RF part.

In operation 940, the apparatus for embedding additional information may downconvert the digital TV broadcast signal including the embedded additional information that has been amplified in the RF part.

In operation 950, the apparatus for embedding additional information may demodulate the frequency-downconverted digital TV broadcast signal. The demodulated digital TV broadcast signal includes the additional information as well as the digital TV broadcast signal. Here, the additional information reflects the distortion in the RF part.

In operations 960 to 990, the apparatus for embedding additional information may compensate for the distortion in the RF part based on the demodulated digital TV broadcast signal.

That is, in operation 960, the apparatus for embedding additional information may determine a symbol of the demodulated digital TV broadcast signal. In operation 930, the additional information is embedded into the digital TV broadcast signal at a transmission power level lower than that of the digital TV broadcast signal. Accordingly, in operation 960, the apparatus for embedding additional information may determine a symbol of the digital TV broadcast signal by modeling the embedded additional information in a form of noise.

In operation 970, the apparatus for embedding additional information may re-demodulate the symbol determined digital TV broadcast signal.

In operation 980, the apparatus for embedding additional information may eliminate the re-demodulated digital TV broadcast signal from the frequency-downconverted digital TV broadcast signal. The frequency-downconverted digital TV broadcast signal includes the additional information as well as the digital TV broadcast signal. Accordingly, the apparatus for embedding additional information may eliminate the re-demodulated digital TV broadcast signal from the frequency-downconverted digital TV broadcast signal to generate demodulated additional information. Here, the demodulated additional information reflects the distortion in the RF part.

In operation 990, the apparatus for embedding additional information may compensate for the distortion in the RF part. In this instance, the apparatus for embedding additional information may calculate a filter coefficient of the digital filter using the demodulated additional information, and the digital filter may be used to compensate for the distortion in the RF part. The detailed description of the distortion compensation using the digital filter is provided in the following with reference to FIG. 11.

Figure 10:
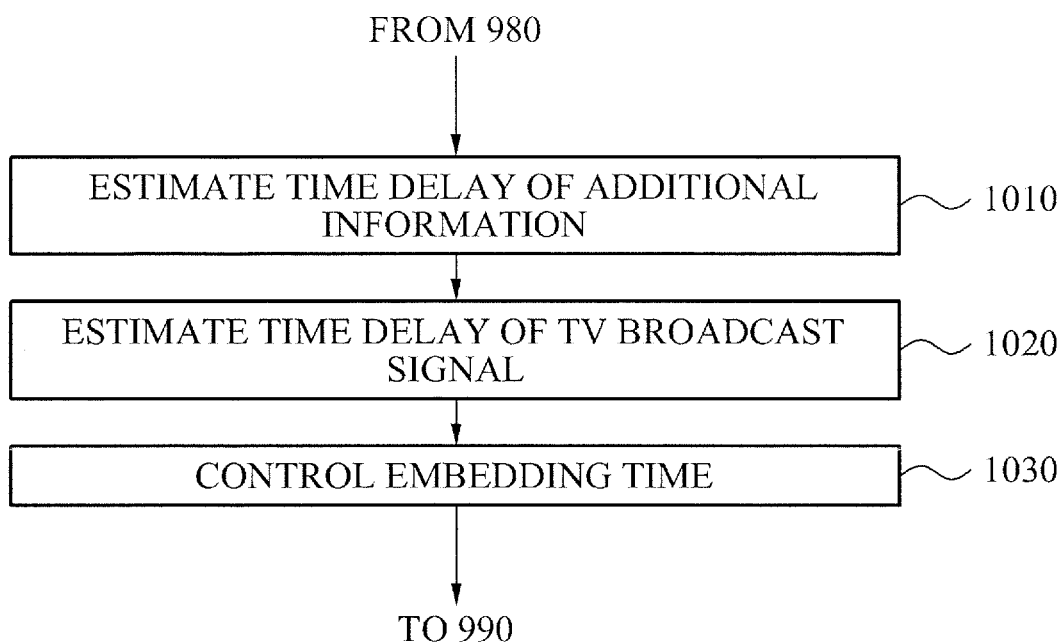
FIG. 10 is a flowchart illustrating a method for estimating a time delay and controlling an additional information embedding time according to an embodiment of the present invention.

FIG. 10 is a flowchart illustrating a method for estimating time delay and controlling an additional information embedding time according to an embodiment of the present invention.

In operation 1010, the apparatus for embedding additional information may estimate the time delay of the additional information.

As an example, the digital TV broadcast signal including the embedded additional information may be transmitted on a frame. The frame may include a transmit preamble at a front portion and the digital TV broadcast signal at the remaining part. The digital TV broadcast signal may have an additional information frame. The additional information frame may include a start, additional information, and an end.

The apparatus for embedding additional information may calculate cross-correlation between the demodulated additional information and the additional information received from the additional information encoding unit using the cross-correlation detector.

The demodulated additional information corresponds to a time-delayed result of the additional information received from the additional information encoding unit.

Accordingly, the apparatus for embedding additional information may determine a time when a highest cross-correlation between the two additional information is calculated as a start of the demodulated additional information.

In operation 1020, the apparatus for embedding additional information may generate a transmit preamble, and may calculate cross-correlation between the generated transmit preamble and the transmit preamble included in the frame using the cross-correlation detector. The apparatus for embedding additional information may determine a time when the highest cross-correlation is calculated as a start of the frame.

As an example, the apparatus for embedding additional information may estimate a difference in time between the start of the frame and the start of the demodulated additional information, as the time delay of the additional information.

In operation 1030, the apparatus for embedding additional information may control an additional information embedding time in consideration of the time delay of the additional information. A detailed description of the control of the additional information embedding time is provided with reference to FIG. 5 and thus, a description is omitted for conciseness.

FIG. 11 is a flowchart illustrating a method for compensating the distortion using the digital filter according to an embodiment of the present invention.

In operation 1110, the modulated additional information may pass through the digital filter.

In operation 1120, the apparatus for embedding additional information may calculate a filter coefficient of the digital filter using the additional information passed through the RF part. As an example, the apparatus for embedding additional information may calculate a filter coefficient of the digital filter such that a difference between the passed additional information and the demodulated additional information is minimal. The digital filter may compensate for the distortion in the RF filter. Here, the apparatus for embedding additional information may calculate the filter coefficient using LMS, RLS, MMSE, and the like.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for embedding additional information, the apparatus comprising:
a modulating unit to modulate additional information related to digital television (TV) broadcast;
a frequency upconverting unit to upconvert the modulated additional information to a high frequency band;
a signal embedding unit to embed the frequency-upconverted additional information into a digital TV broadcast signal related to the digital TV broadcast;
a frequency downconverting unit to downconvert the digital TV broadcast signal including the embedded additional information that has been amplified in a radio frequency (RF) part;
a demodulating unit to demodulate the frequency-downconverted digital TV broadcast signal; and
a distortion compensating unit to compensate for a distortion in the RF part based on the demodulated digital TV broadcast signal.

2. The apparatus of claim 1, wherein the RF part includes a high power amplifier (HPA) or a channel filter.

3. The apparatus of claim 1, further comprising a frequency estimating unit,
wherein the digital TV broadcast signal includes a pilot signal,
the demodulating unit demodulates the pilot signal included in the digital TV broadcast signal,
the frequency estimating unit estimates a frequency offset between the frequency-upconverted additional information and the frequency-upconverted digital TV broadcast signal using the demodulated pilot signal, and
the modulating unit modulates the additional information by reflecting the estimated frequency offset on the additional information.

4. The apparatus of claim 1, further comprising a frequency estimating unit,
wherein the digital TV broadcast signal includes guard interval data and non-guard interval data,
the frequency estimating unit estimates a frequency offset between the frequency-upconverted additional information and the frequency-upconverted digital TV broadcast signal by comparing the guard interval data with the non-guard interval data, and
the modulating unit modulates the additional information by reflecting the estimated frequency offset on the additional information.

5. The apparatus of claim 1, further comprising:
a symbol determining unit to determine a symbol of the demodulated digital TV broadcast signal;
a second modulating unit to re-modulate the symbol determined digital TV broadcast signal; and
a digital TV broadcast signal eliminating unit to eliminate the re-modulated digital TV broadcast signal from the frequency-downconverted digital TV broadcast signal to generate demodulated additional information.

6. The apparatus of claim 5, further comprising:
a time delay estimating unit to estimate the time delay of the additional information by cross-correlating the demodulated additional information to the additional information.

7. The apparatus of claim 6, wherein the time delay estimating unit generates a preamble, and estimates the time delay of the digital TV broadcast signal by cross-correlating the generated preamble to the symbol determined digital TV broadcast signal.

8. The apparatus of claim 7, further comprising:
a start time delay compensating unit to control an additional information embedding time in consideration of the time delay of the digital TV broadcast signal and the time delay of the additional information.

9. The apparatus of claim 5, further comprising:
a digital filter through which the additional information is passed; and
a filter coefficient calculating unit to calculate a filter coefficient of the digital filter such that a difference between the passed additional information and the demodulated additional information is minimum.

10. A method for embedding additional information, the method comprising:
modulating additional information related to digital television (TV) broadcast;
upconverting the modulated additional information to a high frequency band;

embedding the frequency-upconverted additional information into a digital TV broadcast signal related to the digital TV broadcast;

downconverting the digital TV broadcast signal including the embedded additional information that has been amplified in a radio frequency (RF) part;

demodulating the frequency-downconverted digital TV broadcast signal; and compensating for a distortion in the RF part based on the demodulated digital TV broadcast signal.

11. The method of claim 10, further comprising estimating a frequency offset between the frequency-upconverted additional information and the frequency-upconverted digital TV broadcast signal, wherein the digital TV broadcast signal includes a pilot signal, the demodulating of the digital TV broadcast signal includes demodulating the pilot signal included in the digital TV broadcast signal, and the modulating of the additional information includes modulating the additional information by reflecting the estimated frequency offset on the additional information.

12. The method of claim 10, further comprising estimating a frequency offset between the frequency-upconverted additional information and the frequency-upconverted digital TV broadcast signal by comparing guard interval data with non-guard interval data, wherein the digital TV broadcast signal includes the guard interval data and the non-guard interval data, and the modulating of the additional information includes modulating the additional information by reflecting the estimated frequency offset on the additional information.

13. The method of claim 10, further comprising:

determining a symbol of the demodulated digital TV broadcast signal;

re-modulating the symbol determined digital TV broadcast signal; and eliminating the re-modulated digital TV broadcast signal from the frequency-downconverted digital TV broadcast signal to generate demodulated additional information.

14. The method of claim 13, further comprising:

estimating a time delay of the additional information by cross-correlating the demodulated additional information to the additional information.

15. The method of claim 14, further comprising:

generating a preamble, and estimating the time delay of the digital TV broadcast signal by cross-correlating the generated preamble to the symbol determined digital TV broadcast signal.

16. The method of claim 15, further comprising:

controlling an additional information embedding time in consideration of the time delay of the digital TV broadcast signal and the time delay of the additional information.

17. The method of claim 13, further comprising:

passing the additional information through a digital filter; and calculating a filter coefficient of the digital filter such that a difference between the passed additional information and the demodulated additional information is minimum.

18. A non-transitory computer-readable medium comprising a program for executing the method of claim 10.

* * * * *